(12) United States Patent
Zhao et al.

(10) Patent No.: US 12,270,944 B2
(45) Date of Patent: Apr. 8, 2025

(54) LASER SCANNING APPARATUS

(71) Applicant: Huawei Technologies Co., Ltd., Shenzhen (CN)

(72) Inventors: Fei Zhao, Wuhan (CN); Li Zeng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1037 days.

(21) Appl. No.: 17/224,974

(22) Filed: Apr. 7, 2021

(65) Prior Publication Data
US 2021/0223370 A1 Jul. 22, 2021

Related U.S. Application Data

(63) Continuation of application No. PCT/CN2020/097295, filed on Jun. 20, 2020.

(30) Foreign Application Priority Data

Aug. 7, 2019 (CN) .......................... 201910725611.5

(51) Int. Cl.
*G01S 7/48* (2006.01)
*G01S 7/481* (2006.01)
(Continued)

(52) U.S. Cl.
CPC ............ *G01S 7/4817* (2013.01); *G01S 17/42* (2013.01); *G01S 17/58* (2013.01); *G02B 26/105* (2013.01); *G02B 27/095* (2013.01)

(58) Field of Classification Search
USPC ....................................................... 356/4.01
See application file for complete search history.

(56) References Cited

U.S. PATENT DOCUMENTS 7,446,910 B2 11/2008 Tamaru
7,483,193 B2 1/2009 Yamamoto
(Continued)

FOREIGN PATENT DOCUMENTS

CN 1580964 A 2/2005
CN 101114052 A 1/2008
(Continued)

OTHER PUBLICATIONS

English Translation of the Written Opinion for PCT/CN2020/097295 (Year: 2021).*
(Continued)

*Primary Examiner* — James R Hulka
(74) *Attorney, Agent, or Firm* — SLATER MATSIL, LLP

(57) ABSTRACT

Embodiments of this application provide a laser scanning apparatus, which is a key component of a Lidar and may be used in fields such as autonomous driving and intelligent driving. The scanning apparatus includes: a scanning micromirror chip, a packaging shell, and a packaging component. The scanning micromirror chip includes a scanning micromirror and a laser, where the scanning micromirror and the laser are integrated at different positions of the scanning micromirror chip. The packaging shell is located on the scanning micromirror chip, and forms a hollow structure together with the scanning micromirror chip. Both the laser and the packaging component are located in the hollow structure. In addition, the packaging component is fixed on the packaging shell, and is configured to collimate and reflect a beam emitted by the laser, and emit an output beam to the scanning micromirror.

19 Claims, 10 Drawing Sheets

(51) Int. Cl.
*G01S 17/42* (2006.01)
*G01S 17/58* (2006.01)
*G02B 26/10* (2006.01)
*G02B 27/09* (2006.01)

(56) References Cited

U.S. PATENT DOCUMENTS

| | | | |
|---|---|---|---|
| 9,304,316 B2* | 4/2016 | Weiss | G02B 26/105 |
| 9,310,471 B2 | 4/2016 | Sayyah et al. | |
| 10,126,411 B2* | 11/2018 | Gilliland | G01S 7/4817 |
| 10,488,550 B2 | 11/2019 | Albert et al. | |
| 10,564,263 B2 | 2/2020 | Efimov et al. | |
| 10,656,012 B2* | 5/2020 | Atabaki | G01J 3/2803 |
| 11,262,577 B2* | 3/2022 | Sarkar | G02B 27/425 |
| 2006/0098994 A1* | 5/2006 | Tamaru | H04N 1/047 399/17 |
| 2008/0024850 A1* | 1/2008 | Yamamoto | B41J 2/473 359/204.1 |
| 2009/0154872 A1 | 6/2009 | Sherrer et al. | |
| 2014/0327945 A1 | 11/2014 | Weiss et al. | |
| 2015/0378012 A1* | 12/2015 | Sayyah | H01S 5/021 438/25 |
| 2016/0266242 A1 | 9/2016 | Gilliland et al. | |
| 2017/0371066 A1* | 12/2017 | Albert | G01S 17/42 |
| 2019/0018120 A1* | 1/2019 | Efimov | G02B 6/4209 |
| 2019/0195688 A1 | 6/2019 | Atabaki et al. | |
| 2019/0196179 A1 | 6/2019 | Sarkar et al. | |

FOREIGN PATENT DOCUMENTS

| | | | |
|---|---|---|---|
| CN | 101395480 A | 3/2009 | |
| CN | 105324688 A | 2/2016 | |
| CN | 106415309 A | 2/2017 | |
| CN | 107555395 A | 1/2018 | |
| CN | 109254296 A | 1/2019 | |
| EP | 2212717 A2 | 8/2010 | |
| EP | 3260885 A1 | 12/2017 | |
| JP | H1184250 A | 3/1999 | |
| WO | WO-2014203139 A1 * | 12/2014 | G01J 1/0429 |

OTHER PUBLICATIONS

Zhang, C., et al., "Design of space target detection system based on a two-dimensional scanning micro-mirror", The Ninth International Conference on Electronic Measurement and Instruments, Date of Conference: Aug. 16-19, 2009, 4 pages.

Kasturi, A. et al., "MEMS mirror module for programmable light system", Proceedings of SPIE, MOEMS and Miniaturized Systems XVIII, Mar. 4, 2019, 14 pages, San Francisco, California, United States.

* cited by examiner

LASER SCANNING APPARATUS

CROSS-REFERENCE TO RELATED APPLICATIONS

This application is a continuation of International Application No. PCT/CN2020/097295, filed on Jun. 20, 2020, which claims priority to Chinese Patent Application No. 201910725611.5, filed on Aug. 7, 2019. The disclosures of the aforementioned applications are hereby incorporated by reference in their entireties.

TECHNICAL FIELD

Embodiments of this application relate to the field of optical components, and in particular, to a laser scanning apparatus applied to the Lidar or laser projection field.

BACKGROUND

Lidar is a target detection technology. Lidar means that a laser emits a laser beam, the laser beam is diffusely reflected after encountering a target object, and a detector receives a reflected beam; and characteristics such as a distance, an orientation, a height, a velocity, a posture, and a shape of the target object are determined based on the emitted beam and the reflected beam. Lidar is widely used in the field of intelligent driving technologies.

According to its working principle, Lidar mainly includes three parts: an emitting end (responsible for laser scanning), a receiving end (responsible for receiving a laser signal that is fed back), and a drive circuit and a signal processing circuit. These three modules are relatively independent of each other and are expected to be separately integrated into a chip, thereby simplifying installation and significantly reducing costs.

In the existing Lidar, the emitting end part is still established by using with discrete components, such as lasers, optical lenses, and micro-electro-mechanical system (MEMS) micromirrors that are independent of each other. A module size is large and assembly requirements are high. This is not conducive to costs reduction. Therefore, using a transmit end integrated on a chip is an important direction for building low-cost and differentiated competitiveness in the future.

SUMMARY

This application provides a laser scanning apparatus integrated on a chip. Components at an emitting end of the laser scanning apparatus are integrated on the same chip, so as to resolve problems of a large size, high assembly requirements, a difficulty in costs reduction, and the like in the existing emitting end that includes discrete components.

According to a first aspect, an embodiment of this application provides a laser scanning apparatus. The scanning apparatus includes a scanning micromirror chip, a packaging shell, and a packaging component. The scanning micromirror chip includes a scanning micromirror and a laser. The packaging shell is located on the scanning micromirror chip and forms a hollow structure together with the scanning micromirror chip, and the laser is located in the hollow structure. The packaging component is located in the hollow structure, is fixed on the packaging shell, and is configured to: collimate and reflect a beam emitted by the laser, and emit output light (or beam) to the scanning micromirror.

According to a second aspect, an embodiment of this application provides a Lidar, including the laser scanning apparatus disclosed in any one of the seventh to the tenth possible implementations of the first aspect, and a processor; the processor is connected to the detector, and is configured to obtain a position and movement information of a target object based on a detection signal sent by the detector.

DETAILED DESCRIPTION OF ILLUSTRATIVE EMBODIMENTS

Lidar is a target detection technology, in which a laser emits a laser beam, the laser beam is diffusely reflected after encountering a target object, and a detector receives a reflected beam; and characteristics such as a distance, an orientation, a height, a velocity, a posture, and a shape of the target object are determined based on the emitted beam and the reflected beam.

Figure 1:
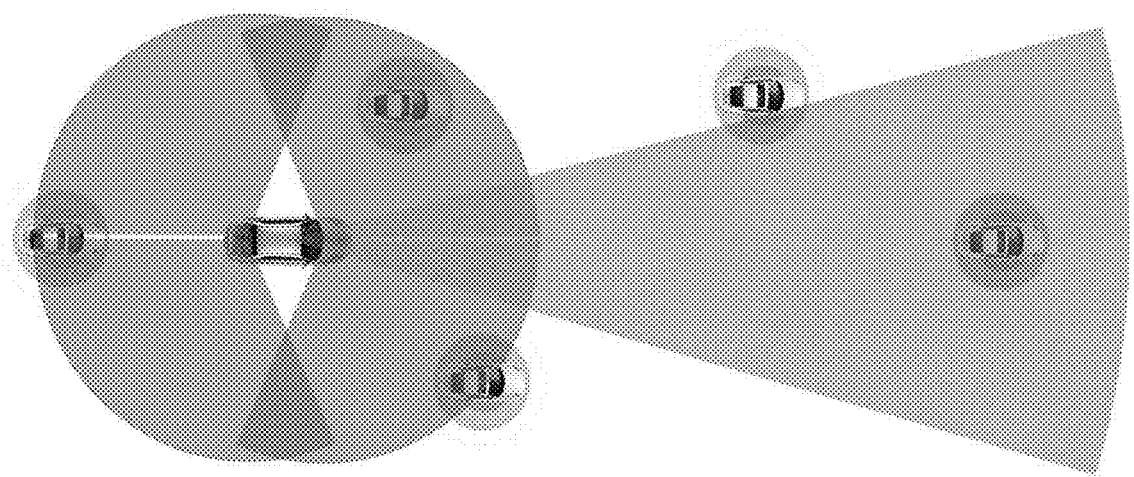
FIG. 1 is a schematic diagram of scanning an ambient environment by a Lidar.

Lidar is applied to a wide variety of fields. In addition to being applied to the military field, Lidar is currently widely used in life, including but not limited to fields such as intelligent driving vehicles, intelligent driving aircraft, 3D printing, virtual reality (VR), augmented reality (AR), and service robots. An intelligent driving vehicle is used as an example. A Lidar is disposed in an intelligent driving vehicle. The Lidar can scan an ambient environment by rapidly and repeatedly emitting a laser beam to obtain point cloud data that represents shapes, positions, and motion statuses of one or more objects in the ambient environment. Specifically, the Lidar emits a laser beam to the ambient environment and receives an echo beam reflected by each object for the laser beam in the ambient environment. The Lidar calculates a time delay between an emission time point of the laser beam and a return time point of the echo beam, to determine location information of each object. In addition, the Lidar can further determine angle information that describes a spatial orientation of the laser beam, and combine the position information of each object with the angle information of the laser beam to generate a three-dimensional map of the scanned ambient environment, as shown in FIG. 1. The three-dimensional map can be used to guide intelligent driving of an unmanned vehicle. Therefore, the Lidar is also referred to as "an eye of an unmanned vehicle." It should be understood that the intelligent driving in this embodiment of this application may be unmanned driving, autonomous driving, assisted driving, or the like.

Figure 2:
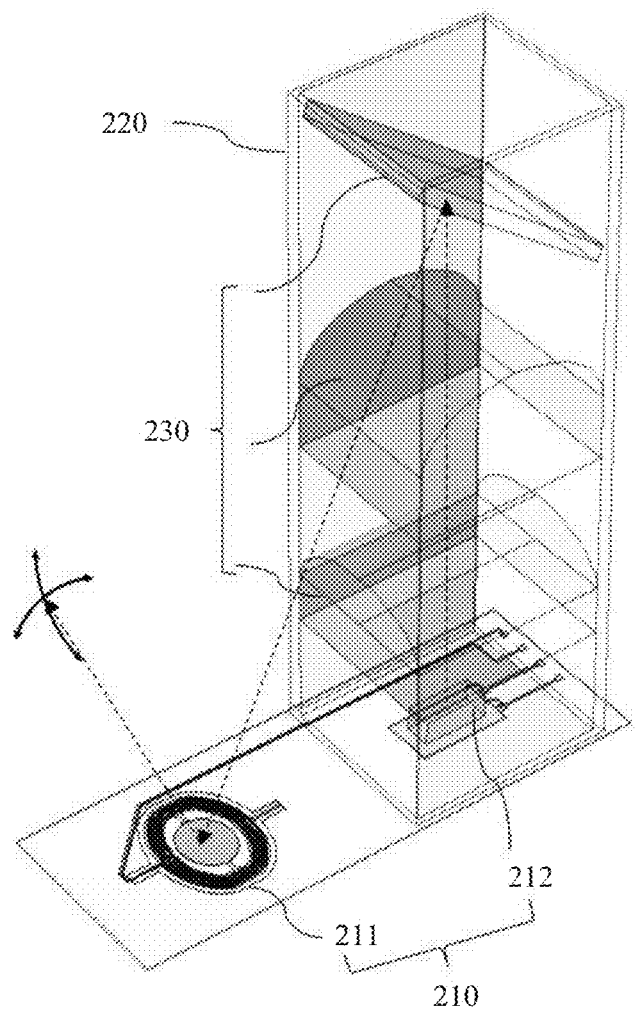
FIG. 2 is a structural diagram of a laser scanning apparatus according to an embodiment of this application.
Figure 3:
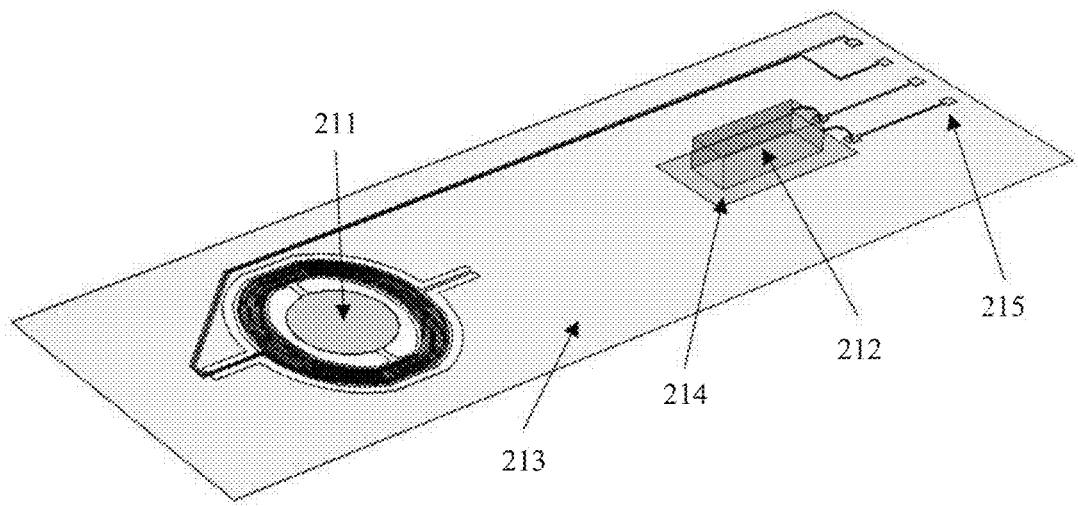
FIG. 3 is a structural diagram of a scanning micromirror chip according to an embodiment of this application.

This application provides a laser scanning apparatus integrated on a chip shown in FIG. 2, which can be applied to the Lidar and laser projection fields. The laser scanning apparatus includes a scanning micromirror chip 210, a packaging shell 220, and a packaging component 230. The scanning micromirror chip 210 includes a scanning micromirror 211 and a laser 212. A specific structure of the scanning micromirror chip 210 is shown in FIG. 3. The scanning micromirror 211 and the laser 212 are integrated at different positions of the scanning micromirror chip 210. Specifically, the scanning micromirror chip 210 can be understood as including a chip layer 213, and the laser 212 and the scanning micromirror 211 can be both integrated at the chip layer 213. The scanning micromirror may be a micro electro mechanical system (MEMS) micromirror, which may be an electrostatic, magnetoelectric, piezoelectric, or thermoelectric scanning micromirror.

As shown in FIG. 3, a surface of the scanning micromirror chip 210 is provided with a laser drive electrode and an external drive electrode 215. The laser 212 can be integrated on the scanning micromirror chip 210 through patching, bonding, metal welding, or the like. The laser 212 is connected to the laser drive electrode through wire bonding, flip-chip bonding, through silicon vias (TSV), or the like. The laser drive electrode is connected to the external drive electrode 215 located on an edge of the scanning micromirror chip 210 through a lead embedded in the scanning micromirror chip 210. The scanning micromirror chip 210 further includes a scanning micromirror drive electrode. The scanning micromirror 211 can also be connected to the scanning micromirror drive electrode through wire bonding, flip-chip bonding, TSV, or the like. The scanning micromirror drive electrode is connected to the external drive electrode 215 located on the edge of the scanning micromirror chip 210 through a lead embedded in the scanning micromirror chip 210.

Further, the laser scanning apparatus further includes a processor. The processor is connected to the external drive electrode 215, and is configured to control laser emission of the laser 212 and control rotation of the scanning micromirror 211 through the external drive electrode 215. The processor can be integrated on the scanning micromirror chip 210, or can be a component independent of the scanning micromirror chip 210, and is connected to the scanning micromirror chip 210 through a signal line. The processor may be an ASIC, an FPGA, a DSP, or the like. This is not limited in this application.

In addition, the surface of the scanning micromirror chip 210 is further provided with a laser heat dissipation area 214. The laser heat dissipation area 214 is located between the laser 212 and the chip layer 213 to enhance heat dissipation for the laser. The laser heat dissipation area 214 can be made of metals such as copper and aluminum, or can be made of materials with high thermal conductivity, such as graphene. This is not limited in this application.

The packaging shell 220 is located on the scanning micromirror chip 210 and forms a hollow structure together with the scanning micromirror chip 210. The laser 212 is located in the hollow structure, which is equivalent to that the laser 212 is covered by the packaging shell 220. Components subsequently located in the hollow structure can be all understood as being covered by the packaging shell 220. The packaging component 230 is also located in the hollow structure and fixed on the packaging shell 220, and is configured to collimate and reflect the beam (or light) emitted by the laser 212, and send the emitted beam to the scanning micromirror 211. The packaging component can be fixed on the packaging shell 220 through a slot, fixing with a mechanical part, pasting, or the like. As shown in FIG. 2, it can also be said that the packaging shell 220 is located on the scanning micromirror chip 210 and covers the laser 212; the packaging component 230 is fixed in the packaging shell 220, and is configured to collimate and reflect the beam emitted by the laser 212, and send the emitted beam to the scanning micromirror 211. In this embodiment of this application, the packaging component fixed on the packaging shell 220 collimates the beam emitted by the laser 212 and changes an optical path. This can ensure that the beam emitted by the laser 212 reaches the scanning micromirror 211 integrated on the scanning micromirror chip 210, implement precise positioning, and avoid subsequent manual adjustment. In addition, three-dimensional space can be fully used, reducing a chip area.

Figure 4:
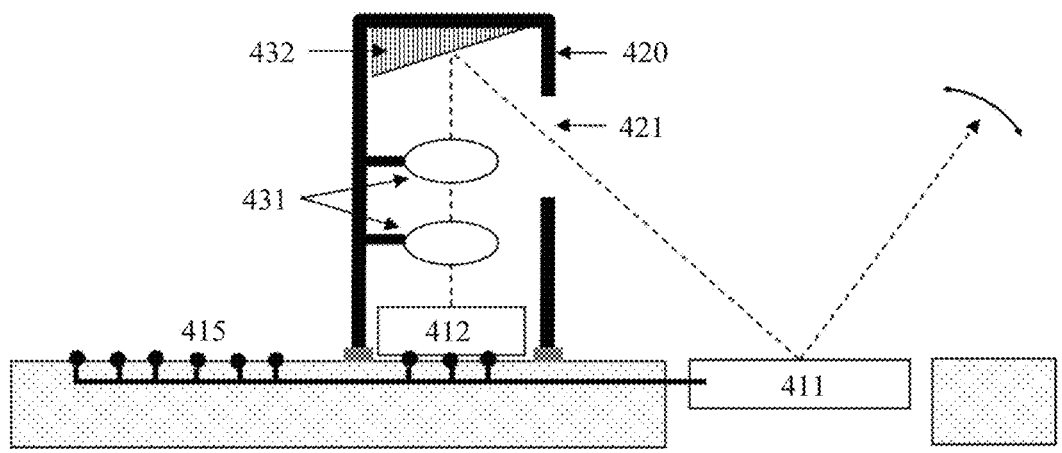
FIG. 4 is a structural diagram of a laser scanning apparatus according to another embodiment of this application.
Figure 5:
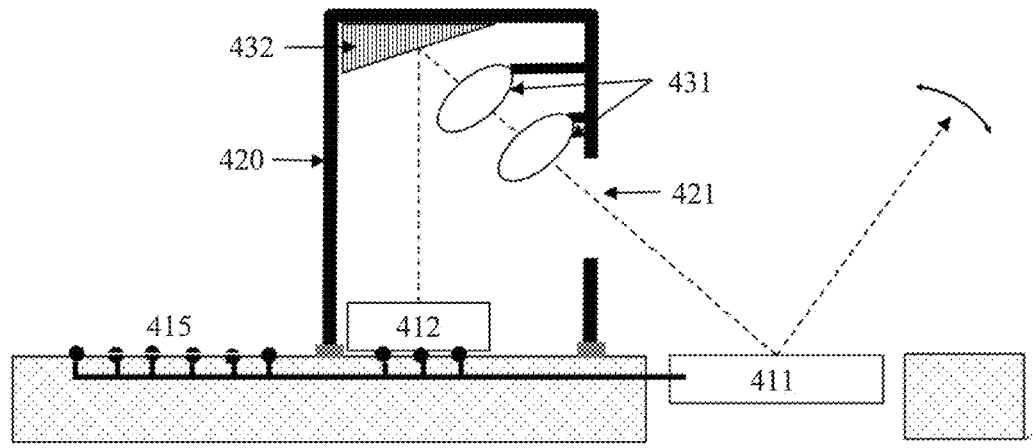
FIG. 5 is a structural diagram of a laser scanning apparatus according to another embodiment of this application.

Specifically, the packaging component may first collimate the beam emitted by the laser 412, and then reflect the collimated beam, as shown in FIG. 4; the packaging component may also first reflect the beam emitted by the laser 412, and then collimate the reflected beam, as shown in FIG. 5. Specifically, the packaging component includes a beam shaping apparatus 431 and a first reflector 432; in the case shown in FIG. 4, the beam shaping apparatus 431 is configured to collimate the beam emitted by the laser 412, and then send the beam to the first reflector 432; the first reflector 432 is configured to reflect the collimated beam to the scanning micromirror 411; in the case shown in FIG. 5, the first reflector 432 is configured to reflect the beam emitted by the laser 412 to the beam shaping apparatus 431; the beam shaping apparatus 431 is configured to collimate the received beam, and send the collimated beam to the scanning micromirror 411. The reference numeral 421 in the figure represents a light window, which can transmit a beam inside the packaging shell 420 to the outside of the packaging shell 420, and can also transmit a beam outside the packaging shell 420 to the inside of the packaging shell 420.

Specifically, the beam shaping apparatus 431 includes a collimation lens. For example, the collimation lens may include a fast axis collimation lens and a slow axis collimation lens, which collimate the fast axis and the slow axis of the beam output by the laser 412, respectively. It can be considered that the collimated beam is a spot beam, and the spot beam is incident on the scanning micromirror at a specific inclination angle. In this case, the scanning micromirror can work in two-dimensional scanning mode. The two-dimensional scanning micromirror includes two rotating shafts, and the scanning micromirror can rotate separately along the two rotating shafts to implement a surface scanning function; it should be noted that the two rotating shafts can be perpendicular to each other; the beam can first pass through the fast axis collimation lens, and then pass through the slow axis collimation lens, or vice versa; the two collimation lenses may be located on the same side of the optical path of the first reflector 432 or may be located on different sides. This is not limited in this application. In addition, for the scanning micromirror whose working mode is one-dimensional scanning, the beam shaping apparatus 431 further includes a beam expander prism, and the beam may first pass through the beam expander prism and then be collimated; or the beam may be first collimated, and then the beam is expanded. For example, in the case shown in FIG. 4, the beam first passes through the fast axis collimation lens, and then passes through the slow axis collimation lens in the beam shaping apparatus 431. The beam expander prism may be located between the laser 412 and the fast axis collimation lens, may be located between the fast axis collimation lens and the slow axis collimation lens, may be located between the slow axis collimation lens and the first reflector 432, or may be located between the first reflector 432 and the scanning micromirror 411. For example, in the case shown in FIG. 5, the beam first passes through the fast axis collimation lens, and then passes through the slow axis collimation lens. The beam expander prism may be located between the laser 412 and the first reflector 432, may be located between the first reflector 432 and the fast axis collimation lens, may be located between the fast axis collimation lens and the slow axis collimation lens, or may be located between the slow axis collimation lens and the scanning micromirror 411. In conclusion, the beam expander prism is located on a propagation path of the beam emitted by the laser 412.

The beam expander prism expands the beam emitted by the laser 412 into a line beam, and a beam expansion direction is parallel to the rotating shaft of the scanning micromirror. The line beam is incident on the scanning micromirror 411 at a specific inclination angle. The one-dimensional scanning micromirror rotates along the rotating shaft to implement a surface scanning function. In addition, if the beam expanding direction of the beam expander prism is the fast axis direction, the fast axis collimation lens may not be used; if the beam expanding direction of the beam expander prism is the slow axis direction, the slow axis collimation lens may not be used, further reducing a quantity of lenses. It should be understood that the beam shaping apparatus may further include more focusing lenses, beam expanders, or the like. This is not limited in this application.

In this embodiment, due to existence of the first reflector 432, a transmission path of a beam may be changed, and the optical path can be folded to reduce a chip size. In this case, there is an angle between the propagation direction of the beam incident on the first reflector 432 and the scanning micromirror chip. It can be understood that the propagation direction of the beam incident on the first reflector 432 is non-parallel to an upper surface of the scanning micromirror chip. For example, an angle of 30 degrees, 50 degrees, or 70 degrees is formed. If the beam is incident on the first reflector 432 after a plurality of times of refraction or reflection, the propagation direction of the beam incident on the first reflector 432 is a propagation direction of a beam transmitted to the first reflector 432 after the last refraction or reflection. The upper surface may be a surface of the scanning micromirror chip on which the laser 412 is integrated.

Figure 6:
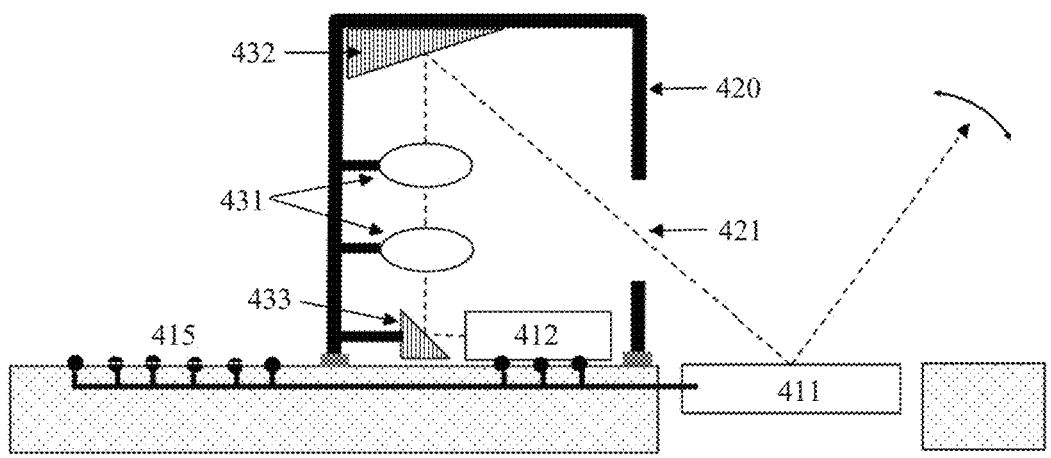
FIG. 6 is a structural diagram of a laser scanning apparatus according to another embodiment of this application.

Optionally, the propagation direction of the beam incident on the first reflector 432 is perpendicular to the scanning micromirror chip. The beam output by the laser 412 can be transmitted to the first reflector 432 in a straight line, and then reflected to the scanning micromirror 411 through the light window 421, as shown in FIG. 4 and FIG. 5. In this case, a vertical cavity emitting laser 412 may be used. The propagation direction of the beam emitted by the laser 412 is perpendicular to the scanning micromirror chip, and the beam can reach the first reflector 432 without changing the propagation direction of the beam. In addition, an optical path of the beam emitted by the laser 412 can also be changed through a second mirror 433 so that the beam reaches the first reflector 432. As shown in FIG. 6, the beam emitted by the laser 412 is parallel to the scanning micromirror chip, and an angle between a reflective surface of the second mirror 433 and the upper surface of the scanning micromirror chip is 45 degrees, the beam emitted by the laser 412 is reflected by the second mirror 433 to the first reflector 432, and a propagation direction of the beam reflected by the second mirror 433 is perpendicular to the scanning micromirror chip. The second reflector 433 is located in the hollow structure; the second reflector 433 can be fixed on the packaging shell 420, or can be fixed on the scanning micromirror chip by etching a positioning groove on the surface of the scanning micromirror chip. The fixing position may be designed in advance to implement the foregoing function and avoid subsequent manual adjustment. The reference numeral 431 in FIG. 4 to FIG. 6 indicates the beam shaping apparatus, and the reference numeral 415 indicates the external drive electrode.

Figure 7:
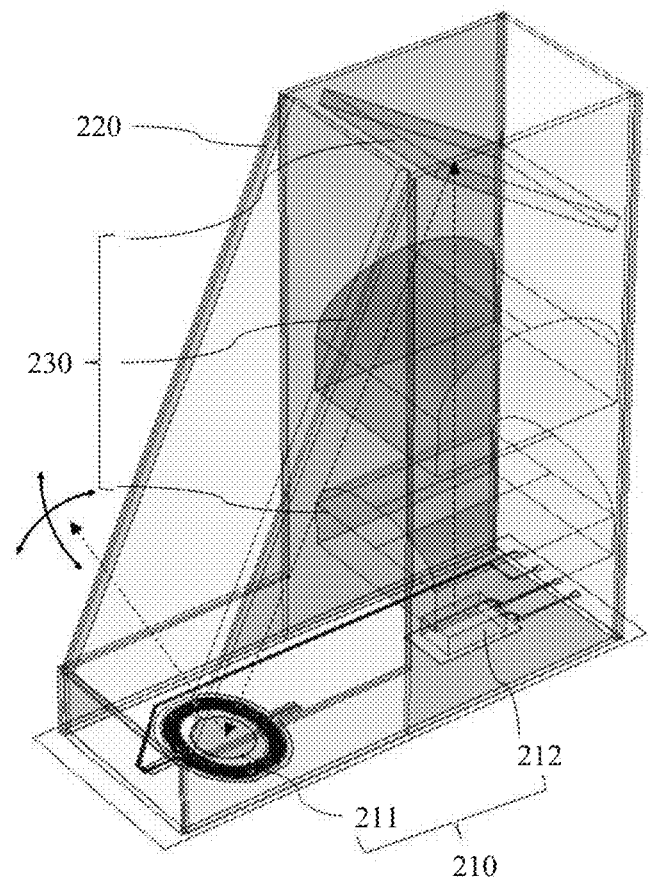
FIG. 7 is a structural diagram of a laser scanning apparatus according to another embodiment of this application.

Optionally, the packaging shell 220 may cover the scanning micromirror 211, as shown in FIG. 7; or may not cover the scanning micromirror 211, as shown in FIG. 2. Specifically, the packaging shell 220 further includes a light window. If the scanning micromirror 211 is located in the hollow structure (covered by the packaging shell 220), the output beam of the scanning micromirror 211 is emitted through the light window; if the scanning micromirror 211 is located outside the hollow structure (not covered by the packaging shell 220), the beam output by the packaging component 230 reaches the scanning micromirror 211 through the light window. The light window not only can transmit the beam in the packaging shell 220 to the outside of the packaging shell 220, but also can implement the collimation or beam expansion function, that is, the beam shaping apparatus can save a lens. For example, when the working mode of the scanning micromirror 211 is two-dimensional scanning, the beam shaping apparatus may include a fast axis collimation lens or a slow axis collimation lens, and use the light window to implement the collimation function; when the working mode of the scanning micromirror is one-dimensional scanning, the light window can further be used to implement the beam expansion function, and there is no need to add a beam expander prism in this case; the light window can also be used to implement the collimation function, and the beam shaping apparatus does not need to include both the fast axis collimation lens and the slow axis collimation lens.

In this embodiment of this application, the laser and the scanning micromirror are integrated into the same scanning micromirror chip, thereby implementing high-precision optical integration, packaging integration, and drive interconnection integration, and reducing chip costs and calibration difficulty; it is also possible to change the conventional optical path parallel to the chip to the optical path perpendicular to the chip through the vertical optical path and the vertically integrated packaging shell and packaging component, thereby resolving problems of a large chip size and high costs due to an excessively large distance between the laser and the scanning micromirror; in addition, the laser and the scanning micromirror do not need to be packaged and controlled separately, thereby reducing packaging costs and a difficulty of an external control circuit.

Figure 8:
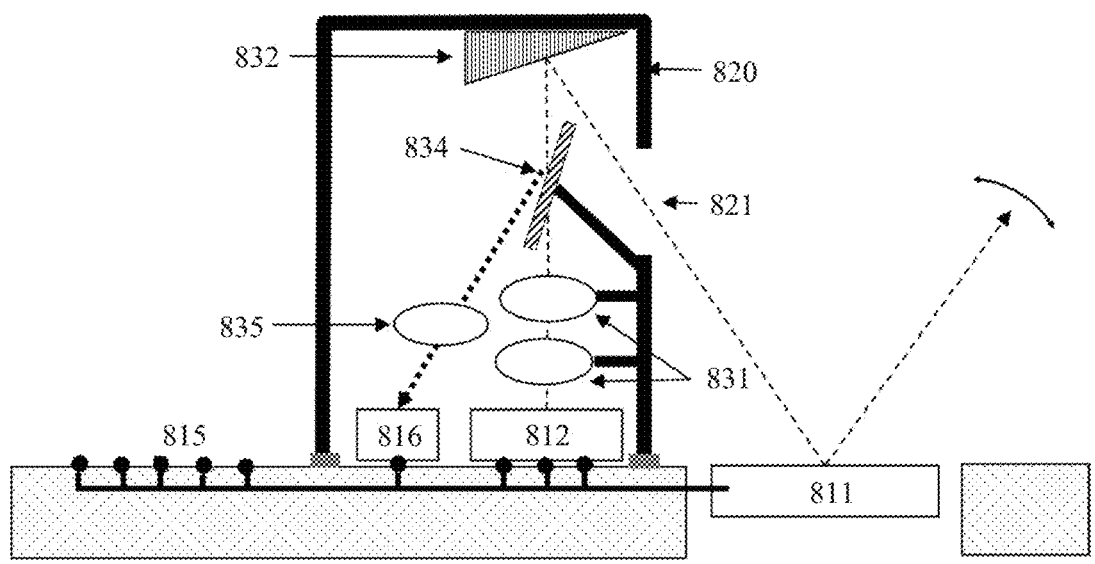
FIG. 8 is a structural diagram of a laser scanning apparatus that integrates a detection function according to another embodiment of this application.

Another embodiment of this application provides a laser scanning apparatus integrated on a chip, which can be applied to the Lidar and laser projection fields. A specific structure is shown in FIG. 8. The laser scanning apparatus may include all the components in the previous embodiments and position relationships between different components. For example, the laser scanning apparatus includes a scanning micromirror chip, a packaging shell, and a packaging component. The scanning micromirror chip includes a scanning micromirror and a laser, and can implement a beam scanning function. In addition, in this embodiment of this application, the laser scanning apparatus may further include a function of detecting feedback beam or light to form a laser scanning transceiver apparatus. For example, in addition to including the beam shaping apparatus 831 and the first reflector 832, the packaging component may further include a semi-reflective and semi-transmissive lens 834 and a probe light lens 835. The scanning micromirror chip may further include a detector 816.

The semi-reflective and semi-transmissive lens 834 is configured to reflect an echo beam to the probe light lens 835. The echo beam is a beam reflected back after a beam emitted by the laser 812 reaches a target object. Because the optical path is reversible, the echo beam is reflected back along the same propagation path as the beam emitted by the laser 812. Therefore, the semi-reflective and semi-transmissive lens 834 may be located on the propagation path of the beam emitted by the laser 812. Because the semi-reflective and semi-transmissive lens 834 has a function of transmitting a part of the beam and reflecting another part of the beam, a part of the emitted beam can be transmitted to implement the scanning function, and a part of the echo beam is reflected for detection. It should be understood that the semi-reflective and semi-transmissive lens 834 is a component included in the packaging component, and is also located in the hollow structure and fixed on the packaging shell, provided that the semi-reflective and semi-transmissive lens 834 is located on the propagation path of the echo beam. A specific position may not be limited.

The probe light lens 835 is configured to focus the echo beam and send the focused beam to the detector 816. The probe light lens 835 may also include a plurality of lenses to form a lens group to focus the echo beam. A specific quantity of lenses is not limited. The detector 816 is configured to detect the focused beam. An integration solution for the detector 816 is the same as an integration solution for the laser 812. The detector 816 can be integrated on the scanning micromirror chip through patching, bonding, metal welding, or the like, and be connected to the external drive electrode 815 located on an edge of the scanning micromirror chip through a lead embedded in the scanning micromirror chip. The detector 816 may be a photodetector.

Figure 9A:
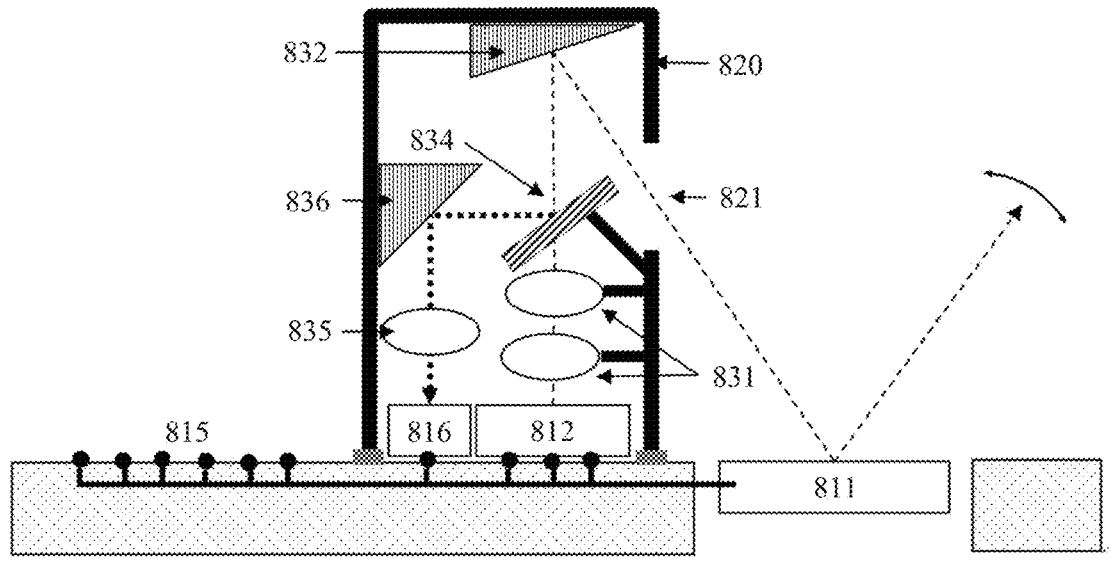
FIG. 9(a) is a structural diagram of a laser scanning apparatus that integrates a detection function according to another embodiment of this application.
Figure 9B:
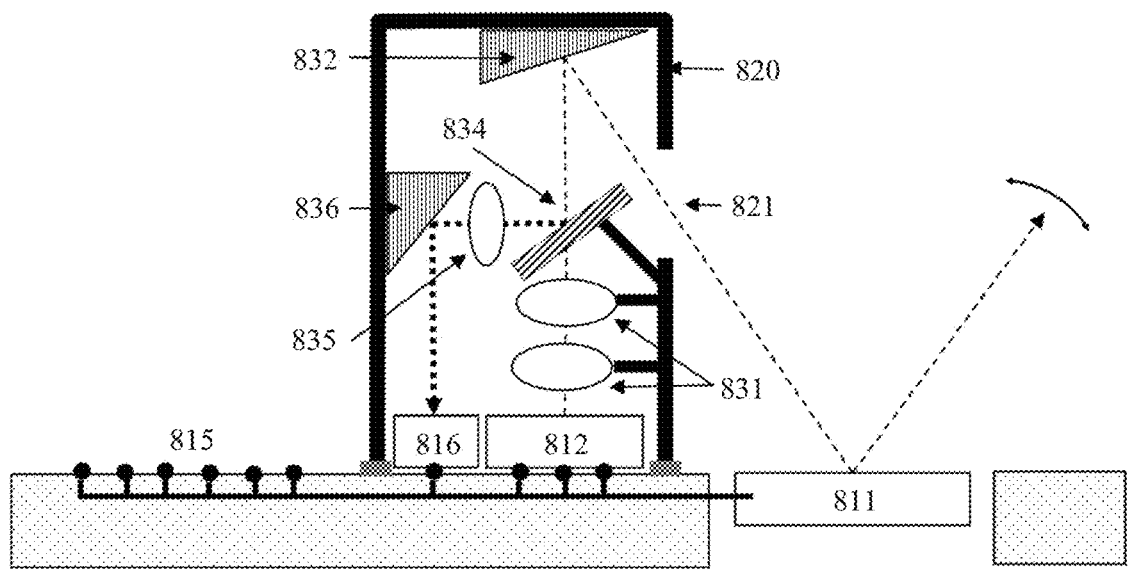
FIG. 9(b) is a structural diagram of a laser scanning apparatus that integrates a detection function according to another embodiment of this application.
Figure 10:
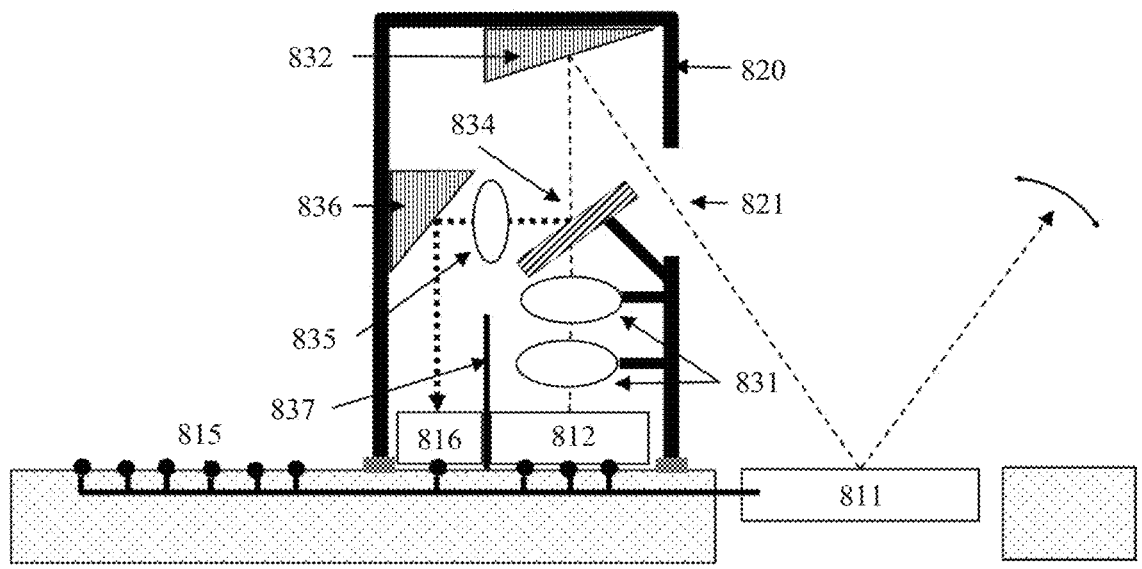
FIG. 10 is a structural diagram of a laser scanning apparatus that integrates a detection function according to another embodiment of this application.

Optionally, the packaging component disclosed in this embodiment further includes a third reflector 836. The third reflector 836 may be located between the semi-reflective and semi-transmissive lens 834 and the probe light lens 835, as shown in FIG. 9(*a*), and is configured to change the propagation direction of the echo beam from the semi-reflective and semi-transmissive lens 834, and send the reflected echo beam to the probe light lens 835. Alternatively, the third reflector 836 may be located between the probe light lens 835 and the detector 816, as shown in FIG. 9(*b*), and is configured to change the propagation direction of the echo beam from the probe light lens 835, and send the reflected echo beam to the detector 816. In addition, the scanning apparatus may further include an isolation plate 837, which is located between the laser and the detector, and is configured to reduce crosstalk between an emitted beam and an echo beam. A specific structure is shown in FIG. 10.

Further, the laser scanning apparatus further includes a processor; the processor is connected to the detector 816, and is configured to obtain a position and movement information of a target object based on a detection signal sent by the detector 816. The processor in this embodiment is the same as the processor configured to control the laser and the scanning micromirror mentioned in the previous embodiment, and details are not described again in this application. In addition, the processor in this embodiment and the processor in the previous embodiment may also be two independent processors, which respectively implement respective functions.

The laser scanning apparatus provided in this embodiment of this application integrates a detector, and on the basis of implementing the laser scanning function, can further implement the echo beam detection function. In addition, by introducing the third reflector 836, the propagation path of the echo beam can be folded to reduce the size of the laser scanning apparatus with the detection function in this embodiment.

Optionally, the hollow structure jointly formed by the packaging shell 820 and the scanning micromirror chip can cover the laser 812, the packaging component, the detector 816, and the scanning micromirror 811, and can also protect the scanning micromirror; alternatively, the hollow structure can cover only the laser 812, the packaging component, and the detector 816. Specifically, the packaging shell 820 further includes a light window. If the scanning micromirror 811 is located in the hollow structure, the output beam of the scanning micromirror 811 is emitted through the light window, and the echo beam is incident on the scanning micromirror 811 through the light window. If the scanning micromirror 811 is located outside the hollow structure, the beam output by the packaging component reaches the scanning micromirror 811 through the light window, and the scanning micromirror 811 sends the echo beam into the packaging shell 820 through the light window.

On the basis of the foregoing embodiment, a plurality of first packaging modules can further be integrated on the scanning micromirror chip. The first packaging module includes a packaging shell, a packaging component, and a laser. The laser and the packaging component are in one-to-one correspondence. The packaging component may include the components disclosed in the foregoing plurality of embodiments, and details are not described again in this embodiment. Optionally, the first packaging module further includes a detector. In addition, the first packaging module may further include a packaging component and a packaging shell, but does not include a laser. In this case, the laser may be a multi-channel laser, and each channel corresponds to one set of packaging components, and provides beams for the corresponding packaging components. It should be noted that, in this embodiment, there is no scanning micromirror in the hollow structure formed by the packaging shell included in the first packaging module and the scanning micromirror chip.

Figure 11A:
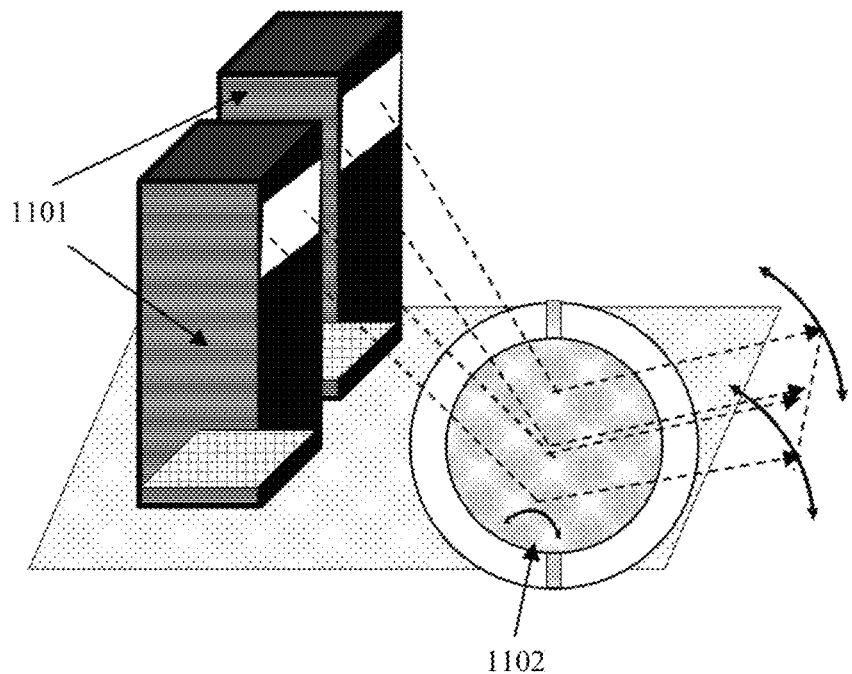
FIG. 11(a) is a structural diagram of a laser scanning apparatus according to another embodiment of this application.
Figure 11B:
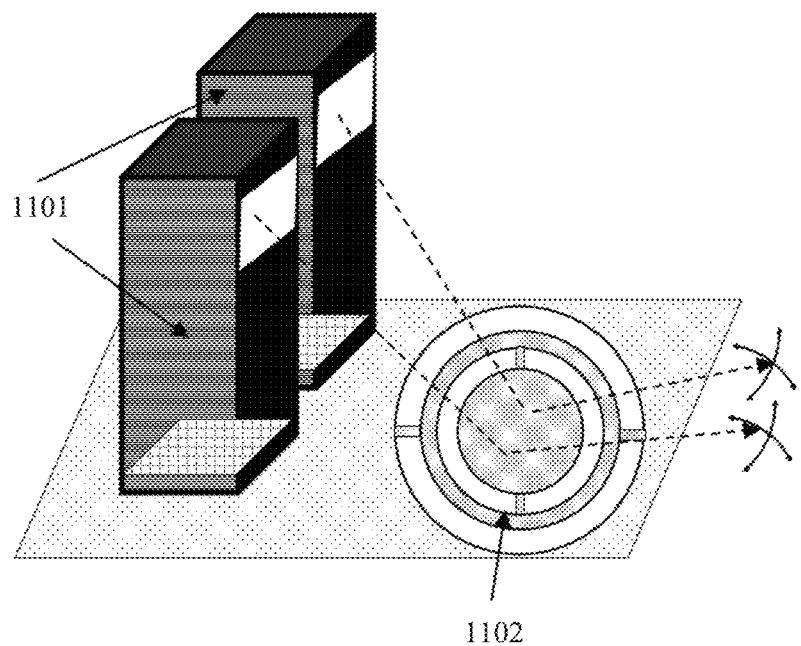
FIG. 11(b) is a structural diagram of a laser scanning apparatus according to another embodiment of this application.

The plurality of integrated first packaging modules 1101 are located on the same side of the scanning micromirror 1102. When the scanning micromirror 1102 is a one-dimensional scanning micromirror, as shown in FIG. 11(*a*), the packaging component in the first packaging module 1101 expands the beam emitted by the laser into a line beam, and the beam expansion direction is parallel to the rotating shaft of the scanning micromirror 1102. Each first packaging module 1101 outputs one line beam, which is incident on the one-dimensional scanning micromirror. The one-dimensional scanning micromirror rotates along the rotating shaft to implement the surface scanning function. Because each line beam has a specific length, a plurality of line beams are scanned together in this embodiment, thereby expanding the scanning range and implementing a larger scanning angle. Optionally, a plurality of line beams are incident on the one-dimensional scanning micromirror at the same incident angle, and are spliced together at the one-dimensional scanning micromirror to form one longer line beam. The one-dimensional scanning micromirror rotates along the rotating shaft to implement the surface scanning function. In this case, scanning results of all line beams can be better spliced together, reducing a quality loss when scanning ranges of adjacent line beams are spliced again.

In addition, the plurality of first packaging modules 1101 may be the same packaging module, or may be different from each other, or some are the same and some other are different. For example, as described in the previous embodiment, the beam shaping apparatus included in the packaging component has a plurality of different structures, and there are also different position relationships between the beam shaping apparatus and the first reflector included in the packaging component. Therefore, internal structures of the first packaging modules 1101 are likely to be different. This is not limited in this embodiment. The first packaging modules 1101 each can have the same internal structure, that is, the structures and position relationships of the packaging component and the laser are the same. The first packaging modules 1101 may have different internal structures, provided that an emitted line beam is incident on the one-dimensional scanning micromirror. Optionally, the beams emitted by the plurality of first packaging modules 1101 are incident on the one-dimensional scanning micromirror at the same incident angle.

When the scanning micromirror 1102 is a two-dimensional scanning micromirror, as shown in FIG. 11(*b*), the packaging component in the first packaging module 1101 collimates a beam emitted by the laser into a spot beam, and the collimated spot beam is incident on the two-dimensional scanning micromirror. The two-dimensional scanning micromirror has two rotating shafts, and can separately rotate along the two rotating shafts to implement the surface scanning function. Because each spot beam can scan an area after being scanned by the two-dimensional scanning micromirror, compared with a single spot beam, a plurality of spot beams together can implement a larger scanning range when the two-dimensional scanning micromirror maintains the same scanning angle. Optionally, a plurality of spot beams are incident on the two-dimensional scanning micromirror at the same incident angle. Further, a plurality of spot beams may be incident on a position of one rotating shaft of the two-dimensional scanning micromirror. When the scanning micromirror 1102 is a two-dimensional scanning micromirror, the plurality of first packaging modules 1101 may have the same internal structure or have different internal structures, or some have the same internal structure and some other have different internal structures. It should be understood that heights of the plurality of first packaging modules 1101 may be the same or different.

In the foregoing embodiment, regardless of whether the scanning micromirror 1102 is a one-dimensional scanning micromirror or a two-dimensional scanning micromirror, the plurality of first packaging modules 1101 are all arranged on the same side of the scanning micromirror 1102. The plurality of first packaging modules 1101 may be arranged in parallel along the edge of the scanning micromirror chip, or may be arranged in a semicircle with the center point of the scanning micromirror 1102 as the center.

Figure 12:
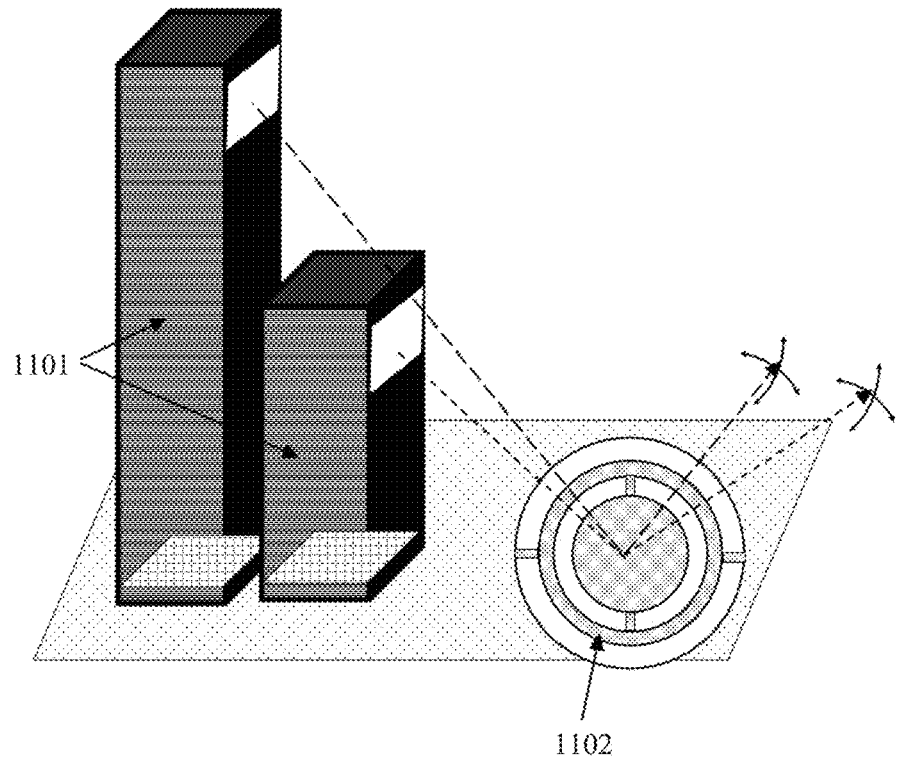
FIG. 12 is a structural diagram of a laser scanning apparatus according to another embodiment of this application.

Optionally, the plurality of first packaging modules 1101 are arranged in one row with the scanning micromirror 1102, as shown in FIG. 11. In this case, the plurality of first packaging modules 1101 are located on the same side of the scanning micromirror 1102 and have different heights. The first packaging module 1101 closer to the scanning micromirror 1102 has a lower height, so that a first packaging module 1101 close to the scanning micromirror 1102 does not block an output beam of a subsequent first packaging module 1101, and the output beams of all first packaging modules 1101 are incident on the scanning micromirror 1102 at different incident angles. It should be understood that FIG. 12 uses a spot beam as an example, and a line beam may also be used. In addition, there are still other arrangement manners of the first packaging modules 1101, which are all within the protection scope of this embodiment. Optionally, when the output beam of the first packaging module 1101 is a spot beam, a plurality of spot beams are incident on the same position of the scanning micromirror 1102; when the output beam of the first packaging module 1101 is a line beam, a plurality of line beams are incident on the same position of the scanning micromirror 1102.

Figure 13A:
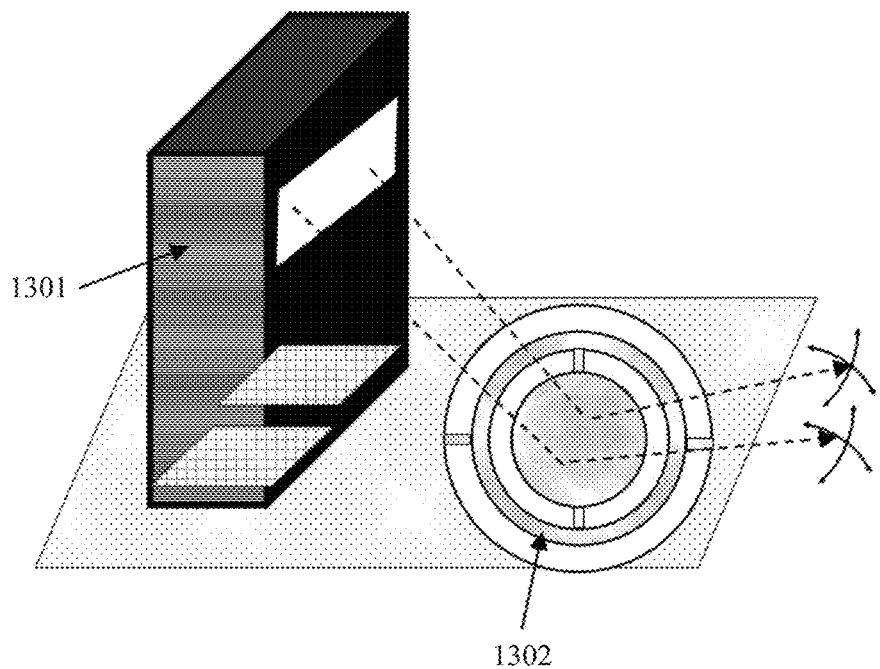
FIG. 13(a) is a structural diagram of a laser scanning apparatus according to another embodiment of this application.
Figure 13B:
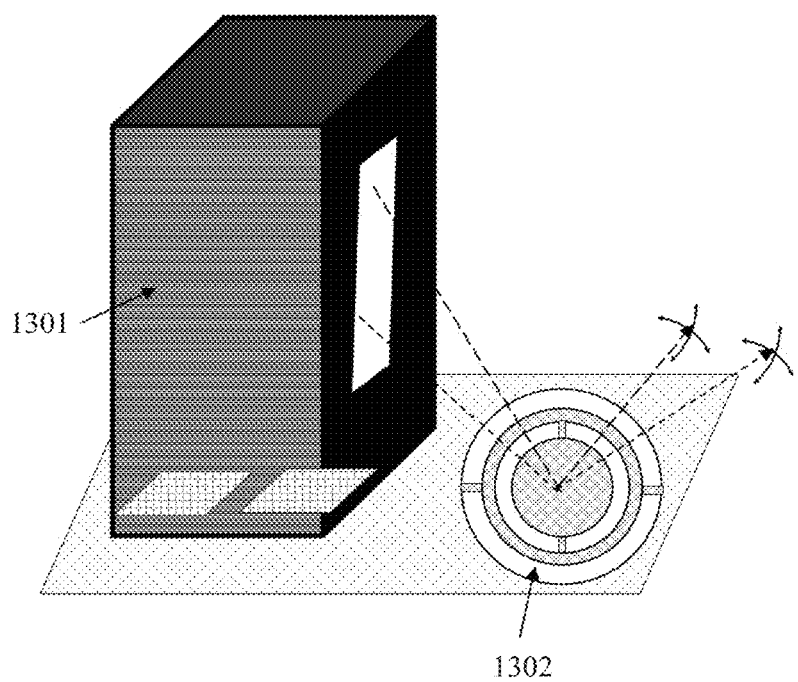
FIG. 13(b) is a structural diagram of a laser scanning apparatus according to another embodiment of this application.

Further, on the basis of the foregoing embodiment, one packaging shell 1301 can also be configured to encapsulate a plurality of second packaging modules, that is, there are a plurality of second packaging modules in the hollow structure, as shown in FIG. 13(*a*) and FIG. 13(*b*). The second packaging module includes a packaging component and a laser, and the laser and the packaging component are in one-to-one correspondence. The packaging component may include the components disclosed in the foregoing embodiments, and details are not described again in this embodiment. Optionally, the second packaging module further includes a detector. In addition, the second packaging module may further include a packaging component, but does not include a laser. In this case, the laser may be a multi-channel laser, and each channel corresponds to one set of packaging components, and provides beams for the corresponding packaging components.

It should be noted that FIG. 13(*a*) and FIG. 13(*b*) only show specific embodiments respectively, and there may be other embodiments with different structures. For example, the arrangement manner of the second packaging modules in the packaging shell 1301 is similar to the arrangement manner of the first packaging modules, a plurality of second packaging modules may be arranged in one row, or may be staggered with each other, and there are a plurality of possible arrangement manners. The plurality of second packaging modules may have the same structure or have different structures, or some have the same structure and some other have different structures. In addition, there may be one light window of the packaging shell 1301, and the output beams of all the second packaging modules are emitted from the light window. There may also be light windows that are in one-to-one correspondence to the second packaging modules, and the output beam of each second packaging module is emitted from the corresponding light window. A quantity of light windows may also be greater than 1 and less than a quantity of the second packaging modules.

In this embodiment, the hollow structure formed by the packaging shell 1301 and the scanning micromirror chip may include a scanning micromirror 1302. In this case, beam output by the scanning micromirror 1302 is emitted through the light window of the packaging shell 1301. There may be no scanning micromirror 1302. In this case, the beams output by the plurality of second packaging modules reach the scanning micromirror 1302 through the light window of the packaging shell 1301. In this embodiment of this application, a plurality of second packaging modules share the same packaging shell 1301, and the entire module and the chip are integrated only once, thereby reducing an error that may be caused by a plurality of times of integration.

In the two embodiments that describe the first packaging module and the second packaging module, the surface of the scanning micromirror chip is also provided with a laser drive electrode and an external drive electrode. A plurality of lasers can be integrated on the scanning micromirror chip through patching, bonding, metal welding, or the like, and be connected to the laser drive electrode through wire bonding, flip-chip bonding, TSV, or the like. The laser drive electrode is connected to the external drive electrode located on an edge of the scanning micromirror chip through a lead embedded in the scanning micromirror chip. In addition, the surface of the scanning micromirror chip may be provided with a plurality of laser heat dissipation areas, and each laser heat dissipation area corresponds to one laser to enhance heat dissipation for the laser. The laser heat dissipation area can be made of metals such as copper and aluminum, or can be made of materials with high thermal conductivity, such as graphene.

Optionally, the laser scanning apparatus may further include a protective shell, configured to cover the entire scanning micromirror chip, the packaging shell, and the packaging component to alleviate impact of an external environment on the chip and the packaging component.

Figure 14:
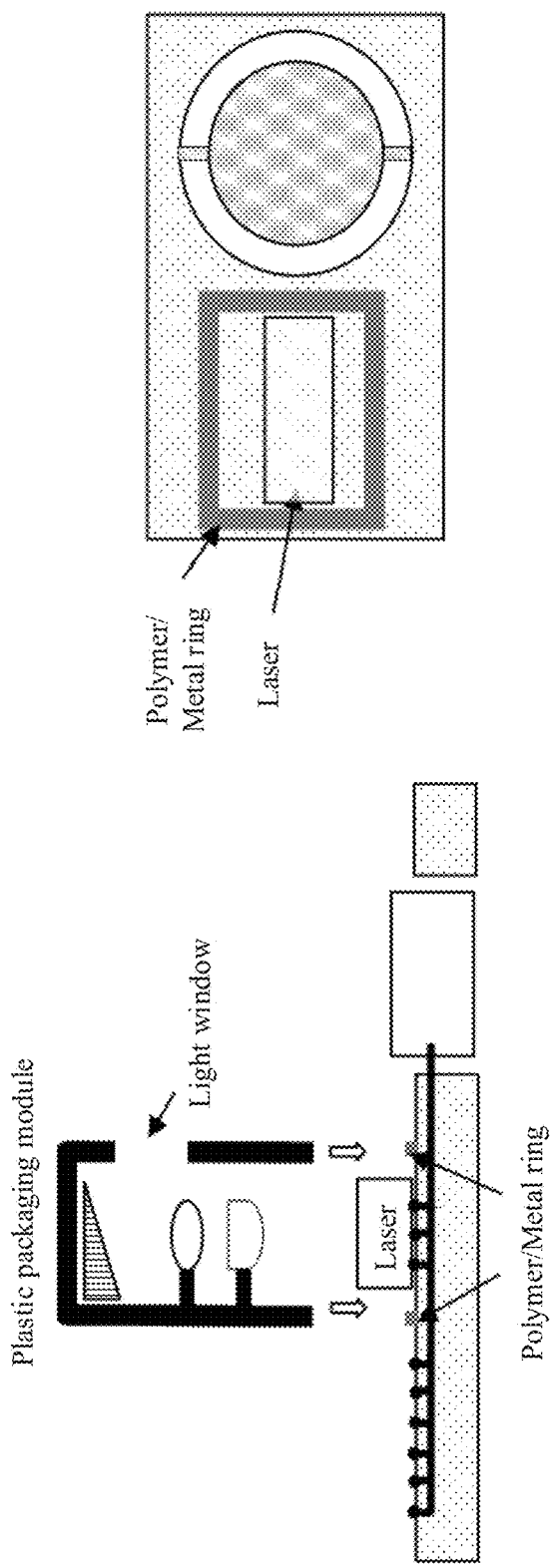
FIG. 14 is a schematic diagram of a packaging shell integration manner according to an embodiment of this application.

In addition, the packaging component is fixed on the packaging shell, and the two form a whole (herein referred to as a plastic packaging module) and are integrated on the scanning micromirror chip. Referring to FIG. 14, several integration manners are as follows:

(1) Metal welding: A circle of metal is arranged at a position on the scanning micromirror chip corresponding to the plastic packaging module as a base welding ring. The base welding ring may be copper and tin alloy (CuSn), gold and tin alloy (AuSn), or the like. The bottom of the plastic packaging module is made of metal (that is, the part of the plastic packaging module to be in contact with the scanning micromirror chip), which may be copper, gold, tin, or the like. A metal welding process (for example, flip-chip bonding) is used to integrate the plastic packaging module with the scanning micromirror chip.

(2) Polymer bonding: A circle of polymer grows at the position corresponding to the plastic packaging module on the scanning micromirror chip as an adhesive material. The plastic packaging module is placed on the polymer, and the polymer is heated and melt so that the plastic packaging module is integrated with the scanning micromirror chip. The polymer may be SU-8 photoresist, benzocyclobutene (BCB), or the like.

(3) Glue bonding: A circle of positioning grooves are etched at the position corresponding to the plastic packaging module on the scanning micromirror chip, the plastic packaging module is installed in the positioning groove, and is bonded with an adhesive such as glue to integrate the plastic packaging module with the scanning micromirror chip.

It should be understood that the packaging shell and the protective shell can be integrated with the scanning micromirror chip in any one of the foregoing manners.

In the laser scanning apparatus provided in this application, the laser and the scanning micromirror are integrated into the same scanning micromirror chip, thereby implementing high-precision optical integration, packaging integration, and drive interconnection integration, and reducing chip costs and calibration difficulty; it is possible to change the conventional optical path parallel to the chip to the optical path perpendicular to the chip through the vertical optical path and the vertically integrated plastic packaging module, thereby resolving problems of a large chip size and high costs due to an excessively large distance between the laser and the scanning micromirror; in addition, the laser and the scanning micromirror do not need to be packaged and controlled separately, thereby reducing packaging costs and a difficulty of an external control circuit; in addition, the plastic packaging module can help implement precise positioning through a base solder ring, a polymer, and a positioning groove on the scanning micromirror, thereby avoiding labor costs for subsequently adjusting an optical component, and implementing mass production.

Another embodiment of this application provides a Lidar, including the laser scanning apparatus provided in all the foregoing embodiments, and a processor. The processor is connected to a detector and is configured to obtain, based on a detection signal, information that represents shapes, positions, and motion statuses of one or more objects in the ambient environment. The processor may be any one of an ASIC, an FPGA, and a DSP. In addition, the processor can also be connected to a laser and a scanning micromirror, and is configured to control laser emission of the laser and control rotation of the scanning micromirror. It should be understood that two separate components may also be used. One component is configured to process a detection signal and the other one component is configured to implement a control function. This is not limited in this application.

Although this application is described with reference to specific features and the embodiments thereof, obviously, various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application.

Obviously, a person skilled in the art can make various modifications and variations to this application without departing from the spirit and scope of the present disclosure. This application is intended to cover these modifications and variations provided that they fall within the scope of protection defined by the following claims and their equivalent technologies.

What is claimed is:

1. An apparatus comprising:
   a scanning micromirror chip comprising a scanning micromirror, a laser, and a detector configured to detect an echo beam;
   a packaging shell, located on the scanning micromirror chip, and forming a hollow structure with the scanning micromirror chip, wherein the laser and detector are located in the hollow structure; and
   a packaging component located in the hollow structure and fixed on the packaging shell, the packaging component configured to collimate and reflect a beam emitted by the laser, and to emit an output beam to the scanning micromirror,
   wherein the echo beam is a beam reflected back after the output beam reaches a target object.

2. An apparatus, comprising:
   a scanning micromirror chip comprising a scanning micromirror, a laser, and a detector configured to detect an echo beam;
   a packaging shell, located on the scanning micromirror chip, and forming a hollow structure with the scanning micromirror chip, wherein the laser and detector are located in the hollow structure; and
   a packaging component located in the hollow structure and fixed on the packaging shell, the packaging component configured to collimate and reflect a beam emitted by the laser, and to emit an output beam to the scanning micromirror,
   wherein the echo beam is a beam reflected back after the output beam reaches a target object;
   wherein the packaging component comprises a beam shaping apparatus and a first reflector;
   wherein the beam shaping apparatus is configured to collimate the beam emitted by the laser, and send the collimated beam to the first reflector; and
   the first reflector is configured to reflect the collimated beam to the scanning micromirror.

3. The apparatus according to claim 2, wherein there is an angle between the scanning micromirror chip and a propagation direction of the collimated beam incident to the first reflector;
   or
   a propagation direction of the collimated beam incident to the first reflector is perpendicular to the scanning micromirror chip.

4. The apparatus according to claim 3, wherein the packaging component further comprises a second reflector, the second reflector configured to change a propagation direction of the beam emitted by the laser to be perpendicular to the scanning micromirror chip.

5. The apparatus according to claim 4, wherein the second reflector is fixed on the packaging shell, or fixed on the scanning micromirror chip using an etched positioning groove on a surface of the scanning micromirror chip.

6. The apparatus according to claim 2, wherein the beam shaping apparatus comprises a collimation lens configured to collimate a received beam.

7. The apparatus according to claim 6, wherein the beam shaping apparatus further comprises a beam expander prism configured to expand the received beam, and a beam expansion direction of the beam expander prism is parallel to a rotating shaft of the scanning micromirror.

8. The apparatus according to claim 1, wherein the packaging component comprises a beam shaping apparatus and a first reflector;
   the first reflector is configured to reflect the beam emitted by the laser to the beam shaping apparatus; and
   the beam shaping apparatus is configured to collimate a received beam, and send the collimated received beam to the scanning micromirror.

9. The apparatus according to claim 1, wherein the packaging shell further comprises a light window, the scanning micromirror is located in the hollow structure, and an output beam of the scanning micromirror is emitted through the light window.

10. The apparatus according to claim 1, wherein the packaging shell further comprises a light window, and a beam output by the packaging component reaches the scanning micromirror through the light window.

11. The apparatus according to claim 1, further comprising a plurality of first packaging modules, wherein each of the plurality of first packaging modules comprises a corresponding packaging shell, a corresponding packaging component, and a corresponding laser.

12. The apparatus according to claim 1, further comprising a plurality of second packaging modules in the hollow structure, wherein the plurality of second packaging modules comprises the packaging component and the laser.

13. The apparatus according to claim 1, wherein the scanning micromirror chip further comprises a chip layer and a heat dissipation area, and the scanning micromirror and the laser are integrated at different positions of the chip layer; and
    the heat dissipation area is located between the laser and the chip layer, and is configured to dissipate heat of the laser.

14. The apparatus according to claim 1, wherein the packaging shell is connected to the scanning micromirror chip through a metal welding ring or a polymer ring; or the scanning micromirror chip comprises an etched positioning groove, and the packaging shell is installed on the etched positioning groove.

15. An apparatus, comprising:
    a scanning micromirror chip comprising a scanning micromirror, a laser, and a detector configured to detect an echo beam;
    a packaging shell, located on the scanning micromirror chip, and forming a hollow structure with the scanning micromirror chip, wherein the laser and detector are located in the hollow structure; and
    a packaging component located in the hollow structure and fixed on the packaging shell, the packaging component configured to collimate and reflect a beam emitted by the laser, and to emit an output beam to the scanning micromirror,
    wherein the packaging component further comprises a semi-reflective and semi-transmissive lens and a probe light lens;
    the semi-reflective and semi-transmissive lens is configured to reflect the echo beam to the probe light lens, and the echo beam is a beam reflected back after the beam emitted by the laser reaches a target object;
    the probe light lens is configured to focus the echo beam and send the focused echo beam to the detector; and
    the detector is configured to detect the focused echo beam.

16. The apparatus according to claim 15, wherein the semi-reflective and semi-transmissive lens is located on a propagation path of the echo beam.

17. The apparatus according to claim 15, wherein the packaging component further comprises a third reflector; and wherein the third reflector is configured to reflect the echo beam sent by the semi-reflective and semi-transmissive lens to the probe light lens; or the third reflector is configured to reflect the echo beam focused by the probe light lens to the detector.

18. The apparatus according to claim 15, further comprising a processor configured to obtain position and movement information of the target object based on a detection signal sent by the detector.

19. The apparatus according to claim 18, wherein the scanning micromirror chip further comprises a drive electrode, and the drive electrode is connected to the laser and the scanning micromirror; and wherein the processor is further configured to control laser emission of the laser and control rotation of the scanning micromirror using the drive electrode.

\* \* \* \* \*